United States Patent
Miyasaka et al.

[11] Patent Number: 5,932,946
[45] Date of Patent: Aug. 3, 1999

[54] POROUS BEARING SYSTEM HAVING INTERNAL GROOVES AND ELECTRIC MOTOR PROVIDED WITH THE SAME

[75] Inventors: Motohiro Miyasaka; Makoto Kondo, both of Matsudo; Shigeru Otsuka, Kadoma, all of Japan

[73] Assignees: Hitachi Powdered Metals Co., Ltd, Chiba, Japan; Matsushita Electric Industrial Co., Ltd., Osaka, Japan

[21] Appl. No.: 09/006,869

[22] Filed: Jan. 14, 1998

Related U.S. Application Data

[62] Division of application No. 08/694,322, Aug. 8, 1996, Pat. No. 5,746,516.

[30] Foreign Application Priority Data

Aug. 11, 1995 [JP] Japan ..... 7-227404

[51] Int. Cl.$^6$ ..... H02K 7/09
[52] U.S. Cl. ..... 310/90.5; 310/90; 310/90.5; 384/100; 384/291; 384/279
[58] Field of Search ..... 310/90, 90.5; 384/100, 384/108, 291, 292, 279, 450

[56] References Cited

U.S. PATENT DOCUMENTS

| | | | |
|---|---|---|---|
| 4,602,873 | 7/1986 | Izumi et al. | 384/99 |
| 4,726,693 | 2/1988 | Anderson et al. | 384/114 |

FOREIGN PATENT DOCUMENTS

| | | |
|---|---|---|
| 47-36739 | 11/1972 | Japan . |
| 61-101124 | 6/1986 | Japan . |
| 62-167921 | 7/1987 | Japan . |
| 62-167922 | 7/1987 | Japan . |
| 5-115146 | 5/1993 | Japan . |

*Primary Examiner*—Nestor Ramirez
*Assistant Examiner*—Thanh Lam
*Attorney, Agent, or Firm*—Birch, Stewart, Kolasch & Birch, LLP

[57] ABSTRACT

An improved porous bearing and a motor which is provided with the porous bearing in which the friction losses and reflection of shaft are reduced, noises caused by the vibrations are avoided with low cogging or low jitter, and in addition, the manufacturing process is simplified to obtain long-life products at low cost. The number (C) of grooves of the porous bearing meets at least one of the following equations:

$$nA+mB-C\neq 0,\ nA-C\neq 0\ \text{and}\ mB-C\neq 0$$

wherein A is the number of magnetic poles of the motor magnet, B is the number of the slots of the armature, and n and m are integers, respectively.

6 Claims, 2 Drawing Sheets

Fig. 1
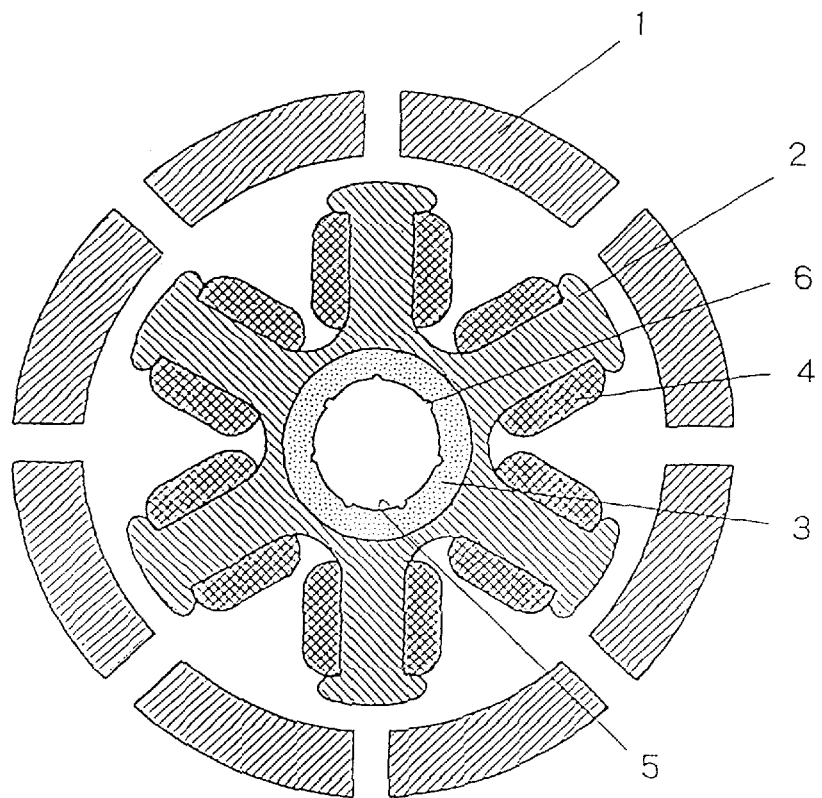
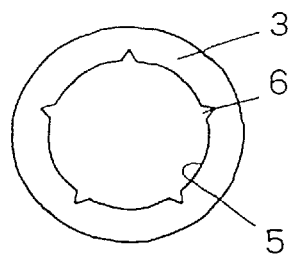
Fig. 2(a)
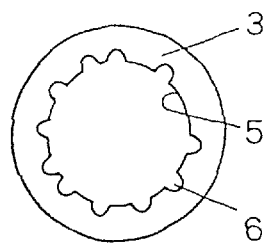
Fig. 2(b)
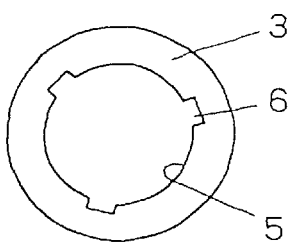
Fig. 2(c)
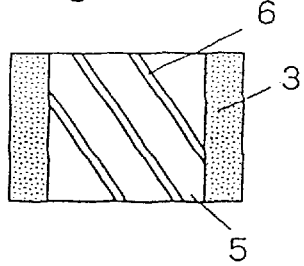
Fig. 2(d)
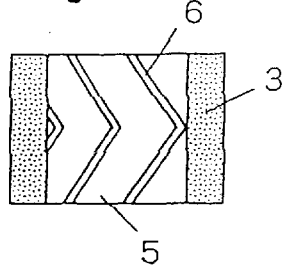
Fig. 2(e)
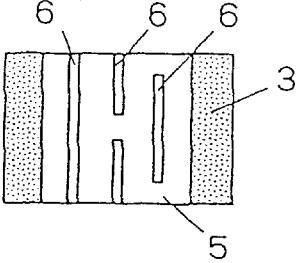
Fig. 2(f)

POROUS BEARING SYSTEM HAVING INTERNAL GROOVES AND ELECTRIC MOTOR PROVIDED WITH THE SAME

This application is a divisional of application Ser. No. 08/694,322, filed on Aug. 8, 1996 now U.S. Pat. No. 5,746,516, the entire contents of which are herby incorporated by reference.

BACKGROUND OF THE INVENTION (1) Field of the Invention

This invention relates to a high precision electric motor which can be operated under the conditions of reduced noises, less vibrations and low cogging or low jitter and to a bearing system for use in such an electric motor. More particularly, the present invention relates to a compact spindle motor for use in the devices for, e.g., CD-ROM, HD, MO and the like in which devices high speed rotation without the reflection of shaft is required.

(2) Prior Art

In order to meet the above requirement, there has been proposed a method to form grooves in a bearing bore. Japanese Utility Model Publication No. 47-36739 discloses a bearing having dense and smooth protruded surfaces and recessed rough surfaces in combination in the bearing surface so as to reduce friction losses and noises. Japanese Laid-Open Utility Model Publication No. 61-101124 discloses a bearing which employs spiral grooves in the bearing bore intending the high rotational accuracy and the reduction of energy losses by introducing lubricant inside as the shaft turns. The bearing has additional advantages that the formation of grooves can be done without difficulty at low cost because the bearing is made of sintered powdered metal. Besides the above ones, Japanese Laid-Open Patent Publication No. 62-167921 and No. 62-167922 disclose a bearing in which the bearing bore comprises more than three plain surfaces formed by modifying the surfaces given by the circular arc, the curvature of which are larger than the that of the circular arc round the center of the bearing shaft, in combination. It is described that this bearing can reduce the friction losses due to the linear contact with the shaft. Japanese Laid-Open Patent Publication No. 5-115146 proposes an oil-impregnated sintered bearing having a plurality of substantially rectangular grooves so as to improve the hydrodynamic pressure functions, to restrain noises and to reduce wear with the simplified structure thereof.

As described above, in view of the increase in the fluid resistance of lubricant that is caused by the increase in revolution speed and the decrease in clearances, the above prior arts have intended to decrease fluid resistance by forming grooves in the bearing bore without expanding the clearance. At the same time, the grooves formed in the bearing bore improve the rigidity of the lubricant film at the shaft supporting potion due to the hydrodynamic pressure effect created in the groove area, thereby preventing the metal-to-contact and restraining the undesirable noises to occur.

The above method to form grooves in the bearing bore surface is indeed useful for reducing the friction loss, however, the accompanied hydrodynamic effect brings about a disadvantage that the vibration of shaft and bearing system is caused to occur. This is not preferable in view of the high precision revolution and it often leads to difficult troubles of making noises in the frequency range harsh to the ear and causing vibrations to occur.

Meanwhile, these bearing devices are mainly used for electric motors, so that, as one of elements for the motors, the relationship between the bearing device and the stator or the rotor of the motor is important. According to the number of the magnetic poles of the motor magnet and the number of the slots of the armature, the cogging or jitter is caused to occur with a harmonic function based on their least common multiples as a matter of their fundamental function, which invites the vibration of the motor itself, its media and the whole system. If the vibrations brought about by the number of magnetic poles and the number of the armature slots are harmonized with the vibrations brought about by the grooves of the bearing bore in frequency resonance condition, the vibrations are amplified with generating large noises and increasing the reflection of shaft, and thereby giving rise to the extreme local wear of the shaft and bearing system.

BRIEF SUMMARY OF THE INVENTION

In view of the foregoing situations, the inventors of this application have carried out intensive studies, and it has been found out that the problems described above can be solved by an internally grooved porous bearing system. That is, the porous bearing has grooves in its bearing bore surface and the number (C) of the grooves, the number (A) of magnetic poles of the motor magnet and the number (B) of the slots of the armature meet at least one of the following equations:

$$nA+mB-C\neq 0,\ nA-C\neq 0\ \text{and}\ mB-C\neq 0,$$

wherein n and m are integers. In addition, if the centers of the grooves are disposed at random pitches in relation to the center of the bearing bore, the noises and vibrations can be reduced in the internally grooved porous bearing system according to the present invention because the noises and vibrations are dispersed in terms of frequency. If both the above factors are met simultaneously, the object to provide the extraordinarily low noise and low vibration motors can be attained by the synergistic effect.

Furthermore, by reducing the bearing bore diameter in at least two regions near both end faces of the bearing body and by forming the grooves in these regions, it is possible to lower further the friction torque.

Moreover, it was found out that the advantages of the grooves according to the present invention are insured by forming such grooves that the porosity of the grooved area is larger than that of the bearing surface other than the grooved area and the porosity in the grooved area is in the range of 5 to 40 percent by area. Furthermore, the effect of the grooves can be enhanced still more with the grooves that the size of the grooves are in the range of 0.1 to 1 mm in width and 5 to 100 $\mu$m in depth.

BRIEF DESCRIPTION OF THE DRAWINGS

The nature, principle and details of the present invention will be more clearly apparent from the following detailed description with respect to preferred embodiments of the invention with accompanying drawings, in which:

FIG. 1 is a schematic illustration of an example of an electric motor of the present invention;

FIG. 2(a) to 2(f) indicate examples of the bearing according to the present invention, in which 2(a) to 2(c) are plan views and 2(d) to 2(f) are vertical cross-sectional views.

DETAILED DESCRIPTION OF THE INVENTION

Figure 3:
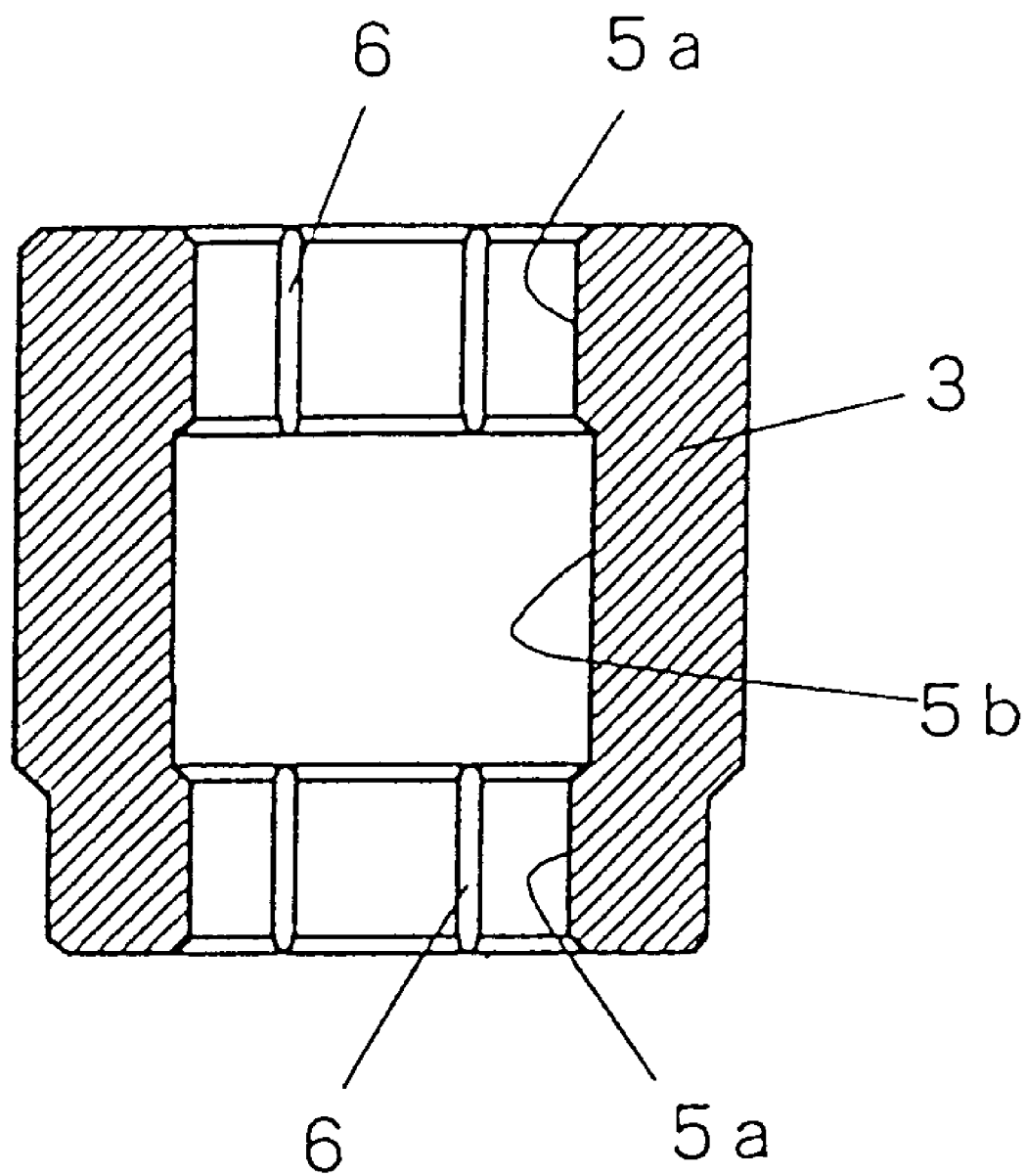
FIG. 3 is a vertical cross-sectional view of another embodiment of the bearing of the present invention.

If the number (C) of the grooves in the porous bearing bore is a prime number relative to the number (A) of the magnetic poles and the number (B) of the armature slots, the resonance amplification of the vibrations caused by the grooves with the vibrations caused by A and B can be avoided. This resonance can also be prevented from occurrence if the next relationships are satisfied:

$$nA-C \neq 0, \text{ and } mB-C \neq 0,$$

wherein n and m are integers.

This means that the number of grooves (C) is an integer excluding the numbers obtained by multiplying A or B by an integer. Furthermore, if the number of grooves satisfies the equation: $nA+mB-C \neq 0$, which implies that the number of grooves are not common multiples of A and B, the resonance will not occur. In summary, all these equations define the number of grooves which is required for preventing the amplification of the vibrations due to the resonance relative to the numerical values of A and B. Then, if the number of grooves satisfies any one of these relationships, the whole motor system with the bearing permit stable revolution with far less noises and vibrations by restraining the amplification of the vibrations due to the resonance. In other words, according to the present invention, the number (C) of the grooves which satisfies any one of the following equations must be excluded:

$$nA-C=0, mB-C=0 \text{ and } nA+mB-C=0.$$

If the grooves are disposed at regular intervals in the wall of bearing bore, large vibrations with a certain frequency inevitably occur depending on the number of the grooves within one revolution regardless the number of the grooves. However, if the grooves are formed in such a way that the centers of grooves are located at irregular angles (randomization of pitches) in relation to the center of the bearing bore, it is possible to divide the vibration into several portions of vibrations in terms of frequency during one revolution. Therefore, the bearing system and the motor with the bearing can be operated with reduced noises and vibrations. The effects of the grooves can be achieved satisfactorily if a bearing is provided with the grooves at least partially in the bearing bore.

If a bearing is provided with at least two shaft supporting potions near each end face of the bearing body, a shaft can be supported between them. As a matter of course, the sliding surface of the bearing having diminished shaft supporting areas is smaller than that of the bearing which supports the shaft with full length of the bearing. Furthermore, in the bearing having the diminished shaft supporting areas, the coaxiality can be improved because of the relatively small area needed to be corrected, which fact may lead to the improvement in the dimensional accuracy of the bearing.

Besides the advantages described in the foregoing, the grooves have other advantages of the reduction of friction due to the approximation to the enlarging of clearance, the hydrodynamic pressure effect on the corners of the grooves and the partial pumping action in the grooved area which is characteristic to porous materials. The term "partial pumping action" means that the oil circulation in which the oil pressure produced in the bearing surface next to the grooved area in rotational direction forces the oil into the bearing body, then, the oil is supplied again to the foreground of groove center area by the negative pressure in the grooved portions induced by the shaft rotation and the expansion of the oil due to the rotational friction heat. And then the end of groove is generated the oil pressure by supplied oil to the groove area.

Regarding the condition of the distribution of pores in the bearing, it is desirable that the shaft supporting part of the bearing bore is less porous than the grooved area in order to support the shaft with the fluid. This can also be affirmed in view of the bearing rigidity and the rigidity of the oil film acting as a hydrodynamic pressure. (Generated by impregnated oil into the porous materials.) However, if it is too dense, it impedes the oil circulation by affecting the pumping action characteristic to the porous materials. It is thus preferable to adjust the porosity in the adequate range. On the other hand, the grooved area may be more porous and it must supply sufficient oil to the shaft supporting area of the bearing bore (i.e. the end of groove) since the foreground grooved area must function as oil supplying port. The preferable rate of porosity in the grooved area is in the range of 5 to 40 percent by area. If it is less than 5 percent, an adequate supply of the oil can not be expected. On the other hand, if it is more than 40 percent, the mechanical strength of the whole body of bearing is low and the pores in the shaft supporting area of the bearing bore are too coarse.

Furthermore, in order to ensure the effects of the grooves according to the present invention, it is necessary that the size of the grooves are 0.1 to 1 mm in width and 5 to 100 $\mu$m in depth. The above-mentioned effects of the groove cannot be expected with the grooves of less than 0.1 mm in width, meanwhile there exists a difficulty in the manufacturing of such thin grooves. The grooves of more than 1 mm width reduce the area of bearing surface which support the shaft with insufficient rigidity of oil film and bearing. If the depth of the groove is less than 5 $\mu$m, the situation is the same as the grooves of less than 0.1 mm in width and any of the advantages described above as a groove can not be expected. Meanwhile, if the depth of the groove is over 100 $\mu$m, it is difficult to expect the hydrodynamic pressure effect and the partial oil pumping effect.

The present invention was made on the premise that the bearing is made of a porous materials. As the operating conditions for such porous bearings having grooves in the bearing bore are high rotational speeds and light loads. The active pumping action can not be expected in the porous bearing system when it is used under small loads, in the porous bearing system having grooves according to the present invention, however, the active circulation of the impregnated oil is provided by the partial pumping action in the grooved area and long and maintenance-free operation of the bearing system can be attained because the oil pumping action characteristic to such porous bearings is effective to loads in certain directions. Furthermore, as compared with the hydrodynamic pressure type bearing made from ingot metal, the porous bearing system of the present invention is advantageous in that the formation of grooves can be done easily and inexpensively, as well as the merit in the pumping action described above.

The invention is illustrated in more detail with reference to the following embodiments, wherein the number (C) of the grooves formed in the porous bearing surface is made to meet at least one of the following equations in connection with the number (A) of the magnetic poles and the number (B) of the slots of the armature:

$$nA+mB-C \neq 0, nA-C \neq 0 \text{ and } mB-C \neq 0$$

wherein n and m are integers.

FIG. 1 is a schematic sectional view of an embodiment of a motor provided with a porous bearing system of the present invention. The number (A) of the magnetic poles of the motor magnet (1) is 8, the number (B) of the slots of the armature (2) having coils (4) is 6, and the number (C) of grooves (6) formed in the inner surface of bore (5) of the bearing (3) is 7. This motor satisfies at least one of the following equations:

$$nA+mB-C\neq 0, nA-C\neq 0 \text{ and } mB-C\neq 0$$

in which n and m are integers. In the actual running test, the operation with low noises, less vibrations and low cogging (or jitter) can be attained.

While in the motors employing the bearing having the number of grooves which does not satisfy any of the relations of nA+mB−C≠0, nA−C≠0 and mB−C≠0 (n and m are integers), serious cogging (or jitter) was generated due to the amplification of the vibration with the least common multiples and their high-frequency components and large vibration and unusual sound were generated.

FIGS. 2(a) to 2(f) illustrate various shapes of the grooves (6) formed in the bores (5) of bearings (3). FIGS. 2(a) to 2(c) are plan views of the bearings (3). FIG. 2(a) illustrates a bearing in which the number of grooves (6) is 5 and the cross-sectional shape of the groove (hereafter referred to as "groove shape") is triangular. FIG. 2(b) illustrates a bearing in which the number of the grooves (6) is 11 and the grooves are discentd with random pitches. The centripetal point is located at the center of the bearing bore considering the balance of hydrodynamic pressure due to the generation of oil film pressure. The groove shape is an elliptical curve. FIG. 2(c) illustrates a bearing in which the number of grooves is 3 and the groove shape is rectangular. The grooves can be formed into any suitable cross-sectional shape as far as they can produce permits the hydrodynamic pressure effect and the oil pumping action.

FIGS. 2(d) to 2(f) are vertical cross-sectional views of other embodiments of bearings (3), respectively. FIG. 2(d) illustrates a bearing in which the grooves (6) are inclined and reach to the end faces of the bearing bore (5). FIG. 2(e) illustrates a bearing in which the grooves (6) are V-shape and FIG. 2(f) illustrates a bearing having grooves (6) which are parallel to the axis of the bearing (3), in which one of the grooves extends to both end faces, one of the grooves is interrupted in the middle portion and one of the grooves is located only the inside of the bearing bore. It should be noted that any of these shapes of the grooves illustrated above and the combination of any shapes do not depart from the scope of the invention if they can produce the hydrodynamic pressure effect and the oil pumping action. According to the experiments carried out by the inventors, the effect of the grooves was produced in any of the embodiments of FIGS. 2(a) to 2(f).

FIG. 3 illustrates another embodiment of a bearing (3) in which a pair of bearing bores (5a) are formed. In the conventional art, two bearing bore members were fitted into a housing to provide a similar system. In this embodiment, the diameter of the bearing bore is enlarged in the middle portion as indicated with a reference numeral (5b) and a shaft (not shown) is supported by the areas (5a) close to the respective end faces and internal grooves (6) are formed in the shaft supporting areas (5a). It was confirmed that the friction torque of the bearing of this type was almost the same as that of the bearing in which two bearing bore members are assembled and the friction torque of the bearing of the present invention was smaller than that of the conventional bearings in which the diameter of bearing bore is even throughout.

The advantages in an internally grooved porous bearing system and a motor which is provided with the bearing system of the present invention consist in the fact that the friction losses and reflection of shaft are reduced by the provision of the simple method described above and the vibration of bearing system and accompanying noises are avoided by dispersing the vibrations in terms of frequency to reduce the resonating. Therefore, the motor system can be operated with low noises, less vibrations and less cogging (or jitter), which have been difficult to attain in a conventional art.

Accordingly, the present invention is able to provide inexpensive and useful bearing means for use in electric motors in which high precision rotation is required. Furthermore, it is expected to prolong the serviceable life of the bearings and electric motors provided with the same.

What is claimed is:

1. An internally grooved porous bearing system which is characterized in that a porous bearing has grooves in its bearing surface and the centers of said grooves are disposed at random pitches relative to a center of a bearing bore.

2. The internally grooved porous bearing system as claimed in claim 1, wherein a distribution of pores in said grooves is rougher than that of the other parts of the bearing surface and a porosity in said grooves is in a range of 5 to 40 percent by area.

3. The internally grooved porous bearing system according to claim 2, wherein a width of the grooves is in a range of 0.1 to 1 mm and a depth of the grooves is in a range of 5 to 100 μm.

4. An internally grooved porous bearing system which is characterized in that a porous bearing is provided with grooves in its bearing surface, that a number (C) of said grooves meets at least one of the following equations:

$$nA+mB-C\neq 0, nA-C\neq 0 \text{ and } mB-C\neq 0$$

wherein A is the number of magnetic poles of a motor magnet, B is the number of the slots of an armature, and n and m are integers, respectively, and that centers of said grooves are disposed at random pitches relative to a center of a bearing bore.

5. The internally grooved porous bearing system as claimed in claim 4, wherein a distribution of pores in said grooves is rougher than that of the other parts of the bearing surface and a porosity in said grooves is in a range of 5 to 40 percent by area.

6. The internally grooved porous bearing system according to claim 5, wherein a width of the grooves is in a range of 0.1 to 1 mm and a depth of the grooves is in a range of 5 to 100 μm.

* * * * *